Inventor.
Floris Koppelmann
By: Spencer & Kaye
Attorneys

Inventor:
Floris Koppelmann
By: Spencer & Kaye
Attorneys

United States Patent Office 3,444,450
Patented May 13, 1969

3,444,450
REACTIVE POWER SUPPLY USING
INVERTER CIRCUITS
Floris Koppelmann, Berlin, Germany, assignor to Licentia Patent-Verwaltungs-G.m.b.H., Frankfurt am Main, Germany
Filed Feb. 15, 1966, Ser. No. 527,427
Claims priority, application Germany, Dec. 17, 1965, L 49,976
Int. Cl. H02p 1/26, 1/42, 7/60
U.S. Cl. 318—227  10 Claims

ABSTRACT OF THE DISCLOSURE

A device for supplying inductive reactive power to the phases of a poly-phase power main. The device includes an inverter composed of a plurality of inverter units, one for each phase; voltage source, connected to the inverter, to supply a D.C. operating voltage thereto; and a plurality of choke coils, one for each phase, each interconnecting one of the inverter units to its associated mains phase. Each of the inverter units includes at least one controllable rectifier and one current return diode connected to supply an output current, while the D.C. voltage source includes a capacitor which may be charged via an A.C.-to-D.C. converter from the mains. Control means are also connected to the inverter to control the conduction of each of the inverter units in synchronism and in controlled phase relation with the mains voltages for feeding inductive reactive current from the inverter to the mains.

---

The present invention relates to the field of electrical control devices, and particularly to devices for supplying a compensating inductive reactive current to a poly-phase power line.

It is an object of the present invention to compensate for the inductive reactive current absorbed by many types of electrical devices, such as transformers and motors, for example.

Another object of the present invention is to provide a multi-phase power system with compensating inductive reactive current.

Yet another object of the present invention is to provide an improved self-commutating, inductive reactive current supply arrangement.

These objects according to the present invention are achieved by the provision of a device for supplying inductive reactive current to the phases of a poly-phase power mains. This device primarily includes inverter means composed of a plurality of inverter units, one for each phase of the mains, each including at least one control rectifier and one current return diode connected for supplying an output current. The device further includes D.C. voltage supply means including a charging capacitor and connected to the inverter means for supplying an operating voltage thereto, and a plurality of choke coils each having one end connected to a respective one of the inverter unit and the other end connectable to the associated mains phase. In addition, the device is provided with control means connected to the inverter means for controlling the conduction of each inverter unit in synchronism with the main voltage and in a controlled phase relation therewith for feeding inductive reactive current from the inverter means to the mains.

Additional objects and advantages of the present invention will become apparent upon consideration of the following description when taken in conjunction with the accompanying drawings in which.

Figure 1:
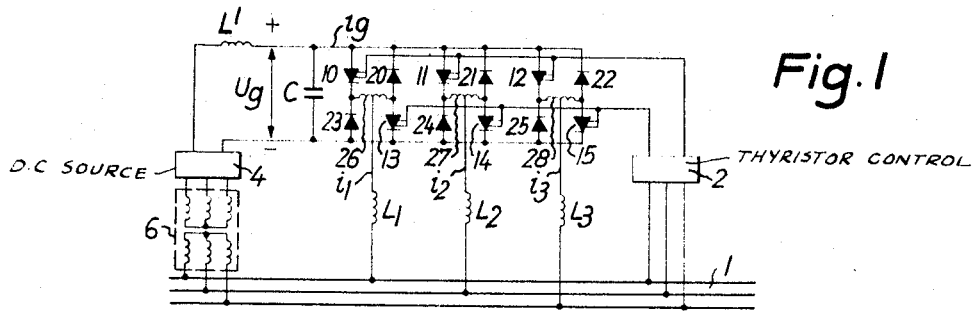
FIGURE 1 is a schematic diagram of one embodiment of the present invention.
Figure 5A:
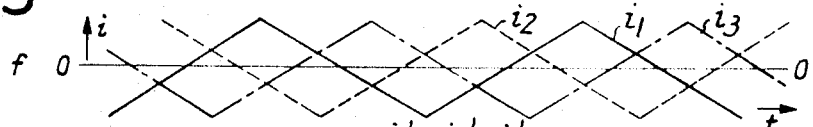
Figure 5B:
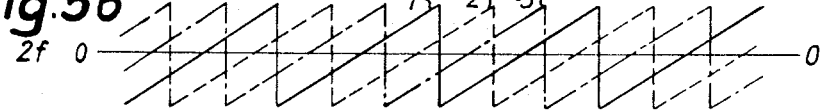
Figure 5C:

FIGURES 5a, 5b, and 5c are diagrams of the current waveforms appearing at various points in the embodiment of FIGURE 1.

Figure 4:
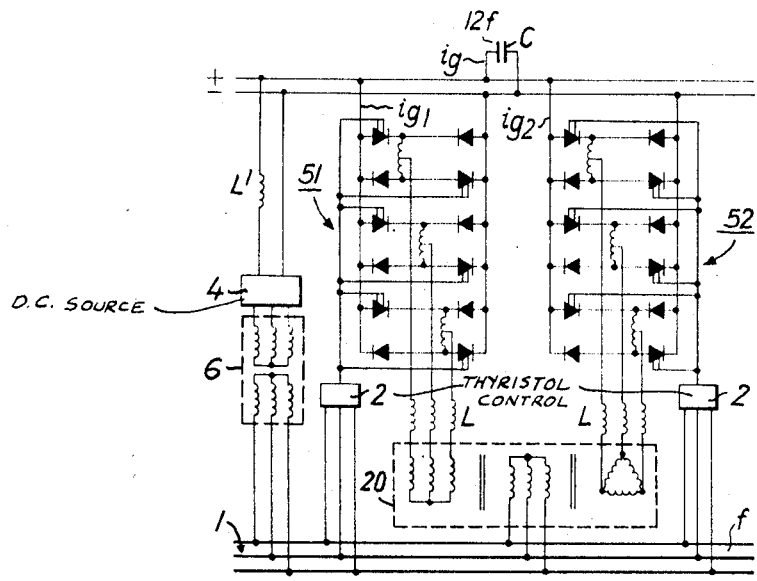
FIGURE 4 is a schematic diagram of still another embodiment of the present invention.
Figure 6A:
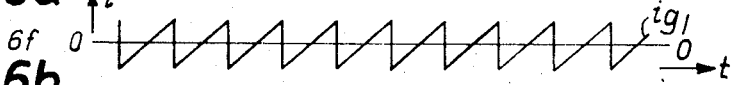
Figure 6B:
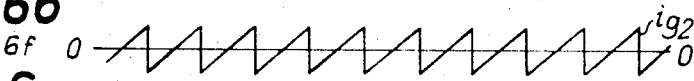
Figure 6C:
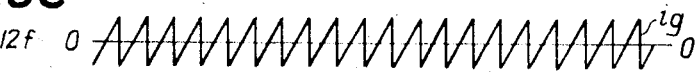

FIGURES 6a, 6b, and 6c are diagrams showing current waveforms appearing at various points in the embodiment of FIGURE 4.

Figure 7:
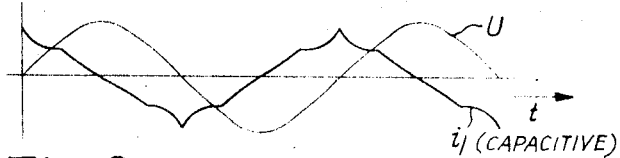

FIGURE 7 is a diagram of the voltage and current waveforms appearing on one phase of the mains in the embodiment of FIGURE 1.

Figure 8:
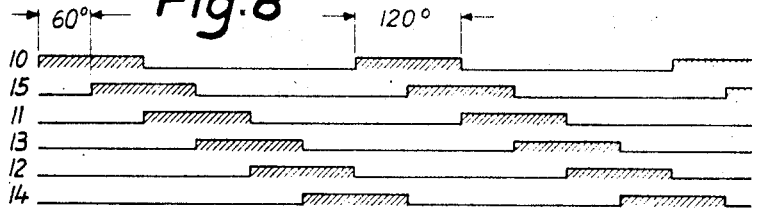

FIGURE 8 are diagrams showing the waveform of the signals sent from the units 2 to the control rectifiers.

FIGURE 1 shows an arrangement for supplying a compensating current to a three-phase power line. For this purpose, there is provided an inverter circuit consisting of controlled rectifiers 10, 11, 12, 13, 14 and 15, and return current diodes 20, 21, 22, 23, 24 and 25, with each of the controlled rectifiers 10 to 15 being connected in series with a respective one of the return current diodes 20 to 25. Each controlled rectifier is poled in the opposite direction from the return current diode with which it is connected in series. (This exact circuit and its operation are shown and described in "AEG-Mitteilungen," 54, 1964, v. 1/2, p. 90/91, FIG. 6.) All of the series arrangements of a controlled rectifier and a return current diode are connected in parallel across a capacitor C and are assembled in pairs, with each pair being inductively connected together at the junction points between the two components of each series arrangement by a respective one of the coils 26, 27 and 28. Each of the resulting pairs of series arrangements constitutes an inverter unit and is connected to one of the phases of the lines 1 through the intermediary of a respective one of three choke coils $L_1$, $L_2$, and $L_3$, each connected to the center tap of a respective one of the coils 26, 27, and 28. Capacitor C is supplied with a D.C. voltage $U_g$ from a D.C. source 4 through the intermediary of a current-smoothing coil L'. The source 4 is supplied with power from the line 1 through the intermediary of a three-phase transformer 6. Source 4 can be constituted by any well-known, commercially available A.C.–D.C. converter.

The control electrodes of controlled rectifiers 10 to 15 are connected to a control circuit 2 which converts the sine wave voltages of the power lines 1 into six rectangular control voltages for the controlled rectifiers. The application of control voltages to the electrodes renders the controlled rectifiers conductive or non-conductive. In the drawing, only one line is shown connected from the control device 2 to each of the controlled rectifiers for purposes of simplicity. Control device 2 may be constituted by any suitable well-known device which can be adjusted to supply control signals in synchronism with the voltages appearing on the power line 1 and at any desired phase angle with respect to these voltages (see "AEG-Mitteilungen," 54, 1964, v. 1/2, pp. 15, 16).

This inverter is intended to supply compensating inductive reactive currents to a load. Normally such an inverter supplies a load with varying frequency, for example, an asynchronous motor whose rate of rotation can be regulated. In accordance with the present invention, in the embodiment of FIGURE 1, the inverter circuit is to supply an inductive reactive current to the lines 1 and accordingly the main voltage 1 controls the controlled rectifiers. With the arrangement shown in FIGURE 1, it is only necessary to provide a direct voltage $U_g$ whose value has a predetermined relation to the peak phase voltage amplitude appearing across the lines 1 and to select the switch-on and switch-off times for the various controlled rectifiers in order to supply both in phase and inductive reactive currents to the lines 1. It is also possible to control the conduction of the rectifiers 10 to 15 in such a way that the amplitude of the in-phase current supplied will be equal to zero and only inductive reactive current will be fed to the power lines 1. In this case, the D.C. current source 4 need supply only little, or no, energy to the converter, the capacitor C then being charged through the diodes 20 to 25 during the half cycles of the power line voltage when the inductive reactive current is not being supplied to the line 1.

FIGURE 5 are diagrams showing the waveforms of the currents existing at various points in the circuit of FIGURE 1 during operation for the case where the inverter is supplying only inductive reactive current to the lines 1. Waveforms of this type are produced if the voltage waveform of the inverter has a rectangular form. Assuming that the inverter is constituted by three single-phase inverter units, the currents flowing between each unit and its associated phase of the supply lines 1 will have the form indicated in FIGURE 5a with the current associated with each inverter unit being phase shifted by 60° with respect to the currents from the remaining units. The conduction periods of rectifiers 10 to 15 are so controlled by control device 2 that the current flowing through each inverter unit has the form of a respective one of the waves shown in FIGURE 5b, each of these waves thus having a frequency equal to twice that of the associated current wave of FIGURE 5a. These currents through the inverter units will be combined to produce the current $i_g$ shown in FIGURE 5c, this current having a frequency equal to six times that of the currents shown in FIGURE 5a. It will be noted that the current $i_g$ does not have a D.C. component and may thus be supplied by the capacitor C without it being necessary for the source 4 to provide any substantial amount of current through the current-smoothing coil L'. In this case the source 4 need only maintain the D.C. voltage $U_g$ across capacitor C. Between each inverter unit and its associated phase of the supply lines 1 there is inserted a respective one of the choke coils $L_1$–$L_3$, which, in accordance with the present invention, absorbs the instantaneous differences between the rectangular voltage across the inverter and the sinusoidal power line voltage and also limits the harmonic content of currents $i_1$–$i_3$.

Both the level of the harmonic content of these currents and the amplitude of the alternating current in capacitor C may be reduced by the provision of several inverters, each identical with that shown in FIGURE 1, which are connected to separate control devices 2, the control devices being arranged so that the switching of the control rectifiers of one inverter is phase shifted with respect to that of the other inverter. Such an arrangement is shown in FIGURE 4 in which the control devices 2 are adjusted so that the phases of the control pulses delivered to one inverter 51 are shifted with respect to those of the control pulses delivered to the other inverter 52 to cause the total current $i_{g1}$ of one inverter 51 to be shifted by 90° with respect to the total current $i_{g2}$ of the other inverter 52. FIGURE 6a shows the waveform of the current $i_{g1}$ while FIGURE 6b shows the waveform of the current $i_{g2}$. The sum of these currents, which appears across the capacitor C, is shown in FIGURE 6c to have a frequency equal to twelve times that of the voltages appearing across the phases of the supply lines 1. While the frequency of the current through the capacitor C is doubled, its amplitude is divided in half so that the load across the capacitor is considerably reduced. Inductive reactive currents are supplied from the inverters to the supply lines 1 through the intermediary of a transformer 20.

Figure 2:
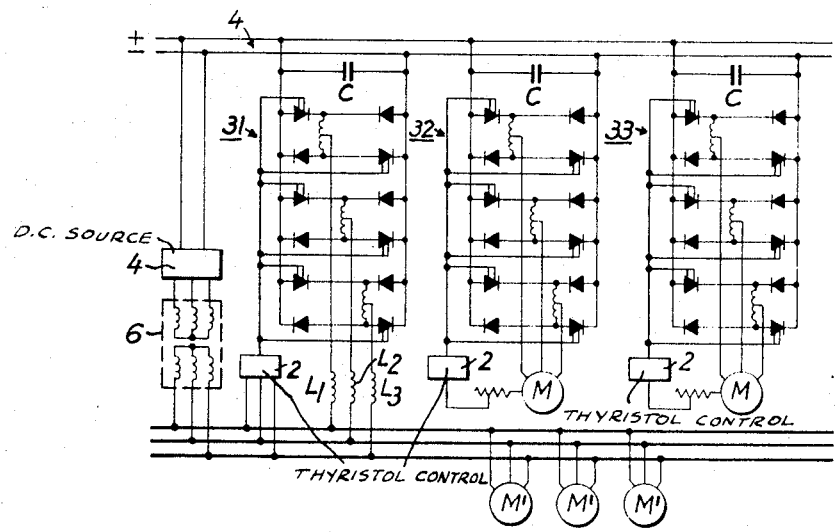
FIGURE 2 is a schematic diagram of another embodiment of the present invention.

Referring now to FIGURE 2, there is shown another embodiment of the present invention in which a single source 4 is used to supply a D.C. voltage to three inverters, each of which is identical with the inverter shown in FIGURE 1 and each of which supplies reactive power to a separate load. Each inverter is provided with a control device 2 which is connected thereto in the same manner as that shown in connection with FIGURE 1. However, for the sake of simplicity, only one line is shown leading from each control unit 2 to the controlled rectifiers of its associated inverter. All of the units 2 are in principle identical. In this embodiment, the inverter 31 is connected to supply inductive reactive current to a line feeding a plurality of three-phase phase motors M′ which are not regulatable with respect to their speed. Inverters 32 and 33 are each connected to supply a respective motor M whose rate of revolution is adjustable. Such a combination of motors occurs frequently in industrial practice.

It is known that devices of the type of motors M′ absorb large amounts of inductive power and that this is detrimental to the efficiency with which the three-phase power can be utilized by other devices. In order to eliminate this drawback, the embodiment of FIGURE 2 is provided with D.C. lines 4′ for supplying power to the inverters 32 and 33 feeding the speed-regulated motors M. At the same time, the inverter 31 is provided for compensating the inductive reactive power absorbed by the motors M′. The D.C. lines 4′ are energized by the source 4 which is fed from the power supply lines through the intermediary of the transformer 6. The exact circuit of control devices 2 associated with inverters 32 and 33 is known (see "AEG-Mitteilungen," 54, 1954, v. 1/2, p. 96/100).

Figure 3:
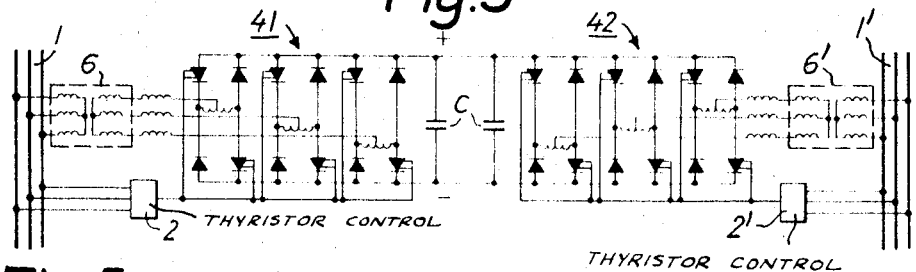
FIGURE 3 is a schematic diagram of still another embodiment of the present invention.

Referring now to FIGURE 3, there is shown another embodiment of the present invention in which two inverters 41 and 42 each of which is identical with the inverter shown in FIGURE 1, are connected in series between a pair of three-phase mains 1 and 1′ through the intermediary of transformers 6 and 6′, respectively. In this embodiment, the control signal sent from the control devices 2 associated with the inverters 41 and 42 can be adjusted in order to permit reactive current to be conveyed through the inverters from one set of power lines to the other, or to cause inductive reactive current to be supplied to both sets of three-phase lines. This arrangement also can be used, for example, to transmit a high D.C. voltage. In the case of high voltages, mercury-vapor tubes having short recovery time can be utilized as the control rectifiers. For smaller voltages, thyristors are preferably used.

Each of the inverters of the device of FIGURE 3 is provided with a capacitor C which supports a current having a frequency equal to a multiple of the power line frequency. As a result, these capacitors can have considerably smaller power requirements than conventional phase shifting capacitors. In addition, in further accordance with the present invention, these capacitors do not have to be rated for A.C. voltage and the cost of these capacitors is therefore substantially reduced.

Referring once again to FIGURE 1, it should be noted that the D.C. voltage $U_g$ must at all times be greater than the peak A.C. voltage of the power line phases in order to prevent any current from flowing from the three-phase power lines 1 into the capacitor C through the D.C. output lines of source 4 by way of the return current diodes 20 to 25.

In accordance with the present invention, inverters may be arranged to provide a constant voltage or a variable voltage by pulsation operation, for example, in a manner known in the art. The inverters may be operated in an interconnected, multi-phase bridge circuit or in a single-phase circuit. If necessary, they may also be utilized for the transmission of real power in both directions, such an operation being possible in the devices of FIGURES 2, 3 and 4, for example.

FIGURE 7 is a diagram showing the waveform of the inverter current $t_1$ supplied to the associated phase of the main-line 1 in the embodiment of FIGURE 1. The waveform U indicates the main voltage of this phase. The harmonic content is indicated in the current waveform $i_1$.

FIGURE 8 are diagrams showing the waveforms of the signals sent from the unit 2 to the control rectifiers 10 to 15. There are six signals of rectangular form with a phase shift of 60° and a duration of 120°. The phase of all the signals can be shifted together with respect to the voltages appearing on the power line 1.

It will be understood that the above description of the present invention is susceptible to various modifications, changes, and adaptations, and the same are intended to be comprehended within the meaning and range of equivalents of the appended claims.

What is claimed is:

1. A device for supplying inductive reactive power to the phases of a poly-phase power mains, comprising, in combination:
   (a) inverter means composed of a plurality of inverter units, one for each phase of the mains, each including at least one controlled rectifier and one current return diode connected for supplying an output current;
   (b) D.C. voltage supply means including a charging capacitor and connected to said inverter means for supplying an operating voltage thereto;
   (c) a plurality of choke coils each having one end connected to a respective one of said inverter units and the other end connectable to the associated mains phase; and
   (d) control means connected to said inverter means for controlling the conduction of each of said inverter units in synchronism with the mains voltages and in a controlled phase relation therewith for feeding inductive reactive current from said inverter means to the mains.

2. An arrangement as defined in claim 1 wherein said D.C. voltage supply means is constituted by a source having an input connectable to the power mains and an output connected in parallel with said charging capacitor for maintaining said capacitor at a predetermined D.C. voltage.

3. An arrangement as defined in claim 1 further comprising:
   (a) at least one additional inverter means composed of a plurality of inverter units, one for each phase of the mains, each including at least one control rectifier and one current return diode connected for supplying an output current, each said additional inverter means being connected to said D.C. voltage supply means;
   (b) at least one additional plurality of choke coils each having one end connected to a respective one of said inverter units of one of said additional inverter means and the other end connectable to the associated mains phase; and
   (c) at least one additional control means connected to a respective one of said additional inverter means for controlling the conduction of each of said inverter units of said additional inverter means in synchronism with the mains voltage and in a controlled phase relation therewith, which phase relation differs from that produced by said first-defined control means for reducing the amplitude of the alternating current through said capacitor.

4. An arrangement as defined in claim 1 wherein said control means and said D.C. voltage supply means are coupled for causing the current supplied by said D.C. voltage supply means to be substantially equal to zero when said inverter means is supplying the desired level of inductive reactive current.

5. An arrangement as defined in claim 1 wherein said controlled phase relation is such that said inverter means also supplies a current component which is in phase with the voltage appearing on the power mains.

6. An arrangement as defined in claim 1 wherein each said control rectifier is constituted by a gas discharge tube having a short recovery time, said gas discharge tubes being connected to said capacitor for being rendered nonconductive by a voltage from said capacitor.

7. An arrangement as defined in claim 1 wherein said inverter is connected to operate in a pulsating manner for controlling the mains current and voltage.

8. An arrangement as defined in claim 1 further comprising: a three-phase power mains having each phase connected to said other end of a respective one of said choke coils; a plurality of three-phase motors fed by said mains and supplied with inductive reactive current by said inverter means; at least one additional inverter means composed of a plurality of inverter units each including at least one controlled rectifier and one current return diode connected for supplying an output current, each said additional inverter means being connected to said D.C. voltage supply means; one additional capacitor for each said additional inverter means connected in parallel with sid supply means across its ssociated additionl inverter means; at least one speed-controlled three-phase motor for each said additional inverter means having each phase of its input connected to a respective one of said inverter units of its associated additional inverter means; and additional control means for each said additional inverter means connected to its associated additional inverter means and to that said speed-controlled motor associated with the same additional inverter means for causing said additional inverter means to supply inductive reactor energization current to said associated speed-controlled motor by controlling the conduction of each of said inverter units in synchronism with a control voltage derived from said associated motor.

9. An arrangement as defined in claim 1 for transmitting power between the phases of two multi-phase power mains, wherein said other ends of said plurality of chokes are connectable to one of the mains, and said D.C. voltage supply means comprises: second inverter means composed of a plurality of inverter units, one for each phase of the second mains, each including at least one control rectifier and one current return diode connected for supplying an output current; a second capacitor connected in parallel with said charging capacitor and with said second inverter means; a second plurality of choke coils each having one end connected to a respective one of said inverter units of said second inverter means and the other end connectable to the associated phase of the second mains; and second control means connected to said second inverter means for controlling the conduction of each of said inverter units of said second inverter means in synchronism with the voltages in the phases of the second mains and a controlled phase relation therewith; said arrangement further including conductor means connected between said capacitors for permitting the physical separation of said capacitors to be varied over a large range.

10. An arrangement as defined in claim 1 wherein said D.C. voltage supply means is arranged for automatically adjusting the operating voltage which it provides in response to the alternating voltage appearing on the power mains for preventing current from flowing from the power mains to the output of said D.C. voltage supply means.

References Cited

UNITED STATES PATENTS

| | | | |
|---|---|---|---|
| 3,336,520 | 8/1967 | Shota Miyairi et al. | 321—5 |
| 3,340,453 | 9/1967 | Bradley et al. | 321—5 |
| 3,348,110 | 10/1967 | Koppelmann | 318—227 |

ROBERT S. MACON, *Primary Examiner.*

T. B. JOIKE, *Assistant Examiner.*

U.S. Cl. X.R.

307—104; 321—5

UNITED STATES PATENT OFFICE

CERTIFICATE OF CORRECTION

Patent No. 3,444,450          Dated May 13th, 1969

Floris Koppelmann

It is certified that error appears in the above-identified patent and that said Letters Patent are hereby corrected as shown below:

In the heading of the patent, line 8, change "Dec." to --February--.
Column 4, line 18, after "inductive" insert --reactive--; line 74, change "$t_1$" to --$i_1$--.
Column 6, line 20, change "sid" to --said--; change "ssociated" to --associated--.

SIGNED AND
SEALED
MAR 3 - 1970

(SEAL)
Attest:

Edward M. Fletcher, Jr.
Attesting Officer

WILLIAM E. SCHUYLER, JR.
Commissioner of Patents